(12) United States Patent
Huang (10) Patent No.: US 11,875,779 B2
(45) Date of Patent: Jan. 16, 2024

(54) VOICE ACTIVITY DETECTION DEVICE AND METHOD

(71) Applicant: REALTEK SEMICONDUCTOR CORPORATION, Hsinchu (TW)

(72) Inventor: Yi-Cheng Huang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 50 days.

(21) Appl. No.: 17/465,888

(22) Filed: Sep. 3, 2021

(65) Prior Publication Data
US 2022/0076659 A1 Mar. 10, 2022

(30) Foreign Application Priority Data
Sep. 8, 2020 (TW) ................................. 109130731

(51) Int. Cl.
| | | |
|---|---|---|
| *G10L 15/00* | (2013.01) | |
| *G10L 25/21* | (2013.01) | |
| *G10L 25/18* | (2013.01) | |
| *G10L 21/0232* | (2013.01) | |

(52) U.S. Cl.
CPC .......... *G10L 15/00* (2013.01); *G10L 21/0232* (2013.01); *G10L 25/18* (2013.01); *G10L 25/21* (2013.01)

(58) Field of Classification Search
CPC ..... G10L 15/00; G10L 15/02; G10L 21/0232; G10L 25/18; G10L 25/21; G10L 25/78
See application file for complete search history.

(56) References Cited

U.S. PATENT DOCUMENTS

| | | | | |
|---|---|---|---|---|
| 6,810,273 B1 * | 10/2004 | Mattila | ............... | G10L 21/0208 379/406.01 |
| 7,171,357 B2 * | 1/2007 | Boland | .................... | G10L 25/78 704/214 |
| 11,450,336 B1 * | 9/2022 | Tang | .................... | G10L 21/0264 |
| 2008/0249771 A1 * | 10/2008 | Wahab | .................... | G10L 25/78 704/E11.003 |
| 2010/0088094 A1 * | 4/2010 | Wang | ....................... | G10L 25/78 704/233 |
| 2012/0215536 A1 * | 8/2012 | Sehlstedt | ................ | G10L 25/18 704/246 |
| 2012/0232896 A1 * | 9/2012 | Taleb | ....................... | G10L 25/78 704/E15.001 |
| 2015/0372723 A1 * | 12/2015 | Gao | .................... | G10L 21/0232 704/205 |

* cited by examiner

*Primary Examiner* — Richemond Dorvil
*Assistant Examiner* — Nadira Sultana
(74) *Attorney, Agent, or Firm* — WPAT, P.C (57) ABSTRACT

Disclosed is a voice activity detection (VAD) device and method capable of referring to an environment detection result and thereby selecting one of multiple VAD results as a basis for determining whether a voice activity occurs. The VAD device includes an environment detection circuit, a VAD circuit, and a voice activity decision circuit. The environment detection circuit is configured to process an audio input signal and thereby generate an environment detection result. The VAD circuit is configured to analyze the audio input signal with multiple VAD algorithms and thereby generate multiple VAD results. The voice activity decision circuit is configured to select one of the multiple VAD results according to the environment detection result.

11 Claims, 7 Drawing Sheets

VOICE ACTIVITY DETECTION DEVICE AND METHOD

BACKGROUND OF THE INVENTION

1. Field of the Invention

The present disclosure relates to a voice activity detection (VAD) device and method, especially to a VAD device and method capable of adopting one of multiple VAD algorithms adaptively.

2. Description of Related Art

Figure 1:
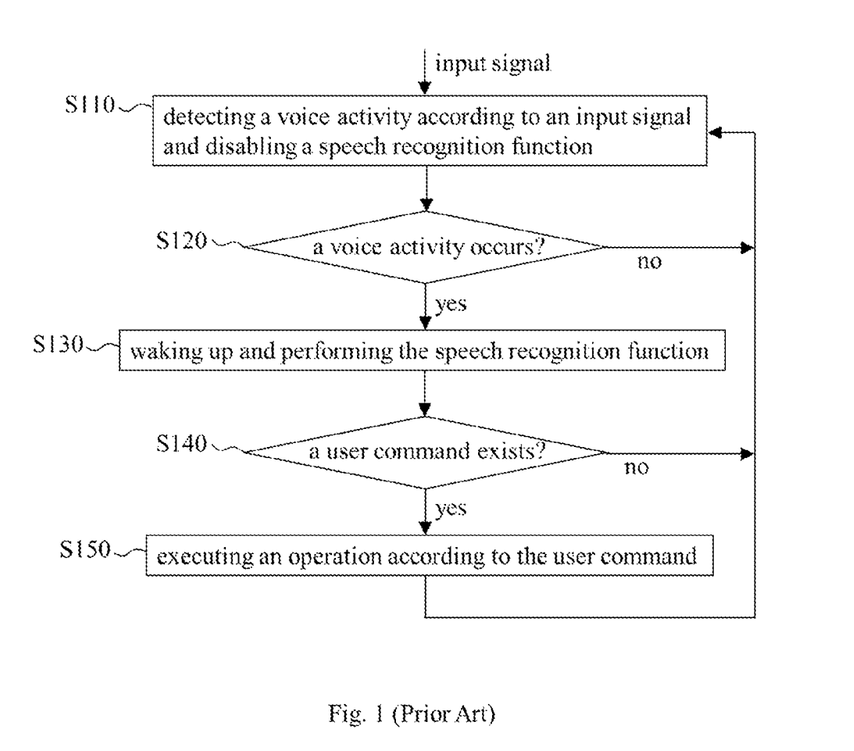
FIG. 1 shows an operation flow of a general voice wake-up system.

Many electronic devices (e.g., portable devices such as a smart phone, a smart watch, and a smart speaker) can recognize voice commands with a speech recognition function and thereby perform a corresponding operation. In order to prevent missing any voice command, an electronic device can keep a speech recognition function enabled; however, most of the time the electronic device receives and processes signals of sounds with the speech recognition function but the sounds are environmental sounds rather than voice commands Therefore, in order to prevent unnecessary signal processing and power dissipation, the electronic device can determine whether a voice activity occurs with a voice activity detection (VAD) function and thereby control the speech recognition function. More specifically, when a voice activity exists, the electronic device wakes up the speech recognition function to let it determine whether a voice command exists; and when a voice activity doesn't exist, the electronic device disables the speech recognition function to prevent power dissipation. A general voice wake-up system includes an operation flow as shown in FIG. 1, and the operation flow includes the following steps:

step S110: detecting a voice activity according to an input signal and disabling a speech recognition function.
step S120: determining whether a voice activity occurs; if yes, going to step S130; if not, returning to step S110.
step S130: waking up and performing the speech recognition function.
step S140: determining whether a user command exists; if yes, going to step S150; if not, returning to step S110.
step S150: executing a corresponding operation according to the user command, and then returning to step S110.

In practice, VAD may be applied in an environment where a lot of ambient noises exist. These ambient noises can be classified into stationary noises and non-stationary noises. The energy of a stationary noise (e.g., sounds of a fan, or sounds in a quiet office) does not vary widely with time, and this kind of noises has a little influence on VAD; on the other hand, the energy of a non-stationary noise (e.g., sounds of a TV, sounds of vehicles in a street, or sounds of a crowd) varies widely with time, and this kind of noises has characteristics similar to characteristics of human voices, and it has a bad influence on the performance and accuracy of VAD.

The performance of VAD can be estimated with two kinds of indices. The first index (hereafter referred to as the "miss index") is indicative of the rate of misrecognizing a voice as a noise, and the second index (hereafter referred to as the "false trigger index") is indicative of the rate of misrecognizing a noise as a voice. The relation between the two indices is usually a tradeoff relation. When the miss index is high, a user may need to repeat what she/he had said, and this causes bad user experience. When the false trigger index is high, the electronic device is forced to do unnecessary signal processing and data transmission, and this leads to power dissipation.

A general electronic device uses a fixed VAD algorithm, and a fixed VAD algorithm may be suitable for one kind of noisy environments, but unsuitable for another kind of noisy environments. Therefore, this technical field needs a technology capable of adopting a suitable VAD algorithm according to the ambient noises of a current environment adaptively so as to achieve a good VAD performance.

SUMMARY OF THE INVENTION

An object of the present disclosure is to provide a voice activity detection (VAD) device and method as an improvement over the prior art.

An embodiment of the VAD device of the present disclosure is capable of referring to an environment detection result and thereby selecting one of multiple VAD results as a basis for determining whether a voice activity occurs. This embodiment includes an environment detection circuit, a VAD circuit, and a voice activity decision circuit. The environment detection circuit is configured to process an audio input signal and thereby generate the environment detection result. The VAD circuit is configured to analyze the audio input signal with multiple VAD algorithms and thereby generate the multiple VAD results. The voice activity decision circuit is configured to select one of the multiple VAD results according to the environment detection result.

Another embodiment of the VAD device of the present disclosure can refer to an environment detection result to select one of multiple VAD algorithms and then generate a VAD result as a basis for determining whether a voice activity occurs. This embodiment includes an environment detection circuit and a voice activity detection and decision circuit. The environment detection circuit is configured to process an audio input signal and thereby generate the environment detection result. The voice activity detection and decision circuit is configured to select one of the multiple VAD algorithms as an applicable VAD algorithm according to the environment detection result, and configured to analyze the audio input signal with the applicable VAD algorithm and thereby generate the VAD result as the basis for determining whether a voice activity occurs.

An embodiment of the VAD method of the present disclosure can select one of multiple VAD results/algorithms according to an environment detection result. This embodiment includes the following steps: receiving and processing an audio input signal and thereby generating the environment detection result; and selecting one of the multiple VAD results as a select VAD result according to the environment detection result, or selecting one of the multiple VAD algorithms as an applicable VAD algorithm according to the environment detection result and then generating the select VAD result according to the applicable VAD algorithm, wherein the multiple VAD results are generated with the multiple VAD algorithms respectively.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present disclosure discusses a voice activity detection (VAD) device and method capable of adopting a suitable VAD algorithm according to the ambient noise of a current environment adaptively and thereby achieving a good VAD performance.

Figure 2:
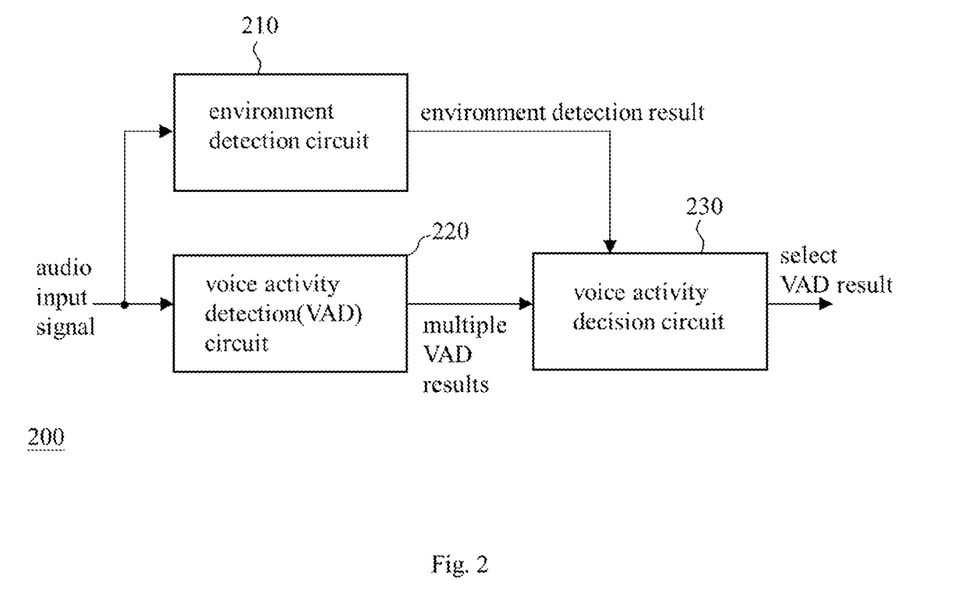
FIG. 2 shows an embodiment of the voice activity detection (VAD) device of the present disclosure.

FIG. 2 shows an embodiment of the VAD device of the present disclosure capable of referring to an environment detection result and thereby selecting one of multiple VAD results as a basis for determining whether a voice activity occurs. The VAD device 200 of FIG. 2 includes an environment detection circuit 210, a VAD circuit 220, and a voice activity decision circuit 230. The environment detection circuit 210 is configured to process an audio input signal and thereby generate an environment detection result. The VAD circuit 220 is configured to analyze the audio input signal with multiple VAD algorithms and thereby generate multiple VAD results. The voice activity decision circuit 230 is configured to select one of the multiple VAD results according to the environment detection result, wherein the voice activity decision circuit 230 is a known/self-developed circuit, and the multiple VAD algorithms are known/self-developed algorithms. In a normal circumstance, these multiple algorithms usually have their respective applicability (e.g., respective miss indices and false trigger indices).

Figure 3:
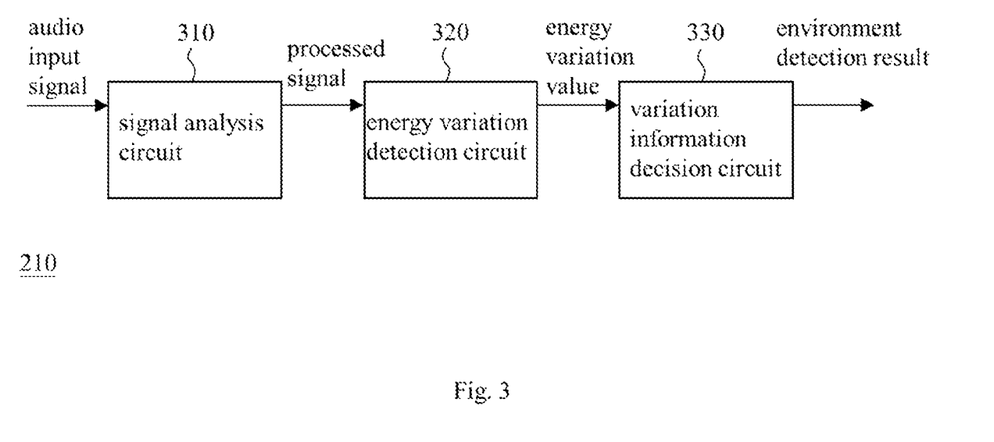
FIG. 3 shows an embodiment of the environment detection circuit of FIG. 2.

FIG. 3 shows an embodiment of the environment detection circuit 210 of FIG. 2. This embodiment includes a signal analysis circuit 310, an energy variation detection circuit 320, and a variation information decision circuit 330. These circuits are described in the following paragraphs.

Please refer to FIG. 3. The signal analysis circuit 310 is configured to generate M processed signal(s) according to the aforementioned audio input signal, wherein the M processed signal(s) are M frequency band signal(s) or M frequency domain signal(s), and the M is a positive integer. In detail, when processing the audio input signal, the signal analysis circuit 310 continually receives and samples the audio input signal; after J sample value(s) (e.g., a plurality of sample values) of the audio input signal is/are obtained and enough to form a frame, the signal analysis circuit 310 generates the M processed signal(s) of this frame according to the J sample value(s). In an exemplary implementation, the signal analysis circuit 310 includes at least one filter circuit (not shown) configured to generate the M frequency band signal(s) of each frame according to the audio input signal; for example, the at least one filter circuit includes M filter(s), each filter generates a frequency band signal and thus the M filter(s) generate(s) the M frequency band signal(s). In another exemplary implementation, the signal analysis circuit 310 includes at least one conversion circuit (e.g., a Fast Fourier Transform (FFT) circuit) (not shown) configured to generate the M frequency domain signal(s) of each frame according to the audio input signal.

Figure 4:
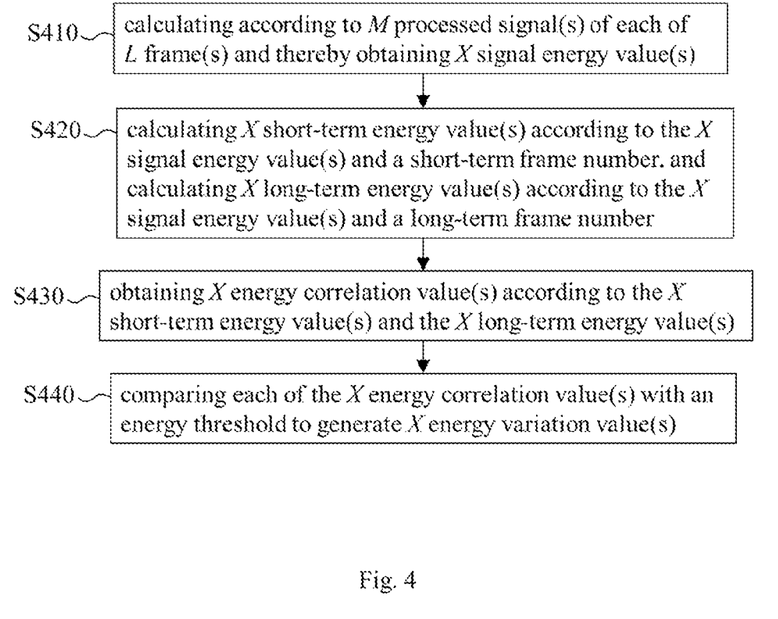
FIG. 4 shows the steps executed by the energy variation detection circuit of FIG. 3.

Please refer to FIG. 3. The energy variation detection circuit 320 is configured to calculate according to the M processed signal(s) of each frame and thereby generate X/L energy variation value(s) per frame; in other words, the energy variation detection circuit 320 generates X energy variation value(s) of L frame(s) in total, wherein the X is equal to a product of the M and the L, and the L is a frame number (i.e., a number of frame(s)). In an exemplary implementation, the energy variation detection circuit 320 performs a plurality of steps as shown in FIG. 4, the steps including:

step S410: calculating according to the M processed signal(s) of each of the L frame(s) and thereby obtaining X signal energy value(s). For example, step S410 calculates the energy of each frequency band/domain signal in each frame with the equation (1) below and thereby obtains M×L=X signal energy value(s) ($E_{m,l}$). Take frequency band signals; step S410 calculates the sum of energy of N sample points of each frequency band signal in each frame, wherein each sample point is defined by a sample period such as $$\frac{1}{44100 \text{ Hz}}$$

or $$\frac{1}{48000 \text{ Hz}}.$$

$$E_{m,l} = \sum_{k=1}^{N} x_{m,l}^2(k), \, m = 1 \sim M \qquad \text{eq. (1)}$$

In eq. (1), the suffix "l" is a frame index that is between 1 and L; the suffix "m" is a frequency band/domain signal index that is between 1 and M; the M is the number of the frequency band/domain signal(s) in connection with the $l^{th}$ frame; the N is the number of data units of the $m^{th}$ frequency band/domain signal in the $l^{th}$ frame; and the $x_{m,l}(k)$ is the value of the $k^{th}$ data unit of the $m^{th}$ frequency band/domain signal in the $l^{th}$ frame.

step S420: calculating X short-term energy value(s) according to the X signal energy value(s) and a short-term frame number ($p_{st}$), and calculating X long-term energy value(s) according to the X signal energy value(s) and a long-term frame number ($p_{lt}$). For example, step S420 calculates the X short-term energy value(s) (i.e., X short-term average energy value(s) here) and the X long-term energy value(s) (i.e., X long-term average energy value(s) here) with the following equation (2):

$$E\_st_{m,l} = \frac{1}{p_{st}} \sum_{i=0}^{p_{st}-1} E_{m,(l-i)} \qquad \text{eq. (2)}$$

$$E\_lt_{m,l} = \frac{1}{p_{lt}} \sum_{i=0}^{p_{lt}-1} E_{m,(l-i)}$$

step S430: obtaining X energy correlation value(s) according to the X short-term energy value(s) and the X long-term energy value(s). For example, step S430 calculates the X energy correlation value(s) with the following equation (3):

$$\frac{E\_st_{m,l}}{E\_lt_{m,l}} \qquad \text{eq. (3)}$$

step S440: comparing each of the X energy correlation value(s) with an energy threshold ($thr_m$) to generate the X energy variation value(s). For example, if an energy correlation value $$\left(\frac{E\_st_{m,l}}{E\_lt_{m,l}}\right)$$

is greater than the energy threshold, step S440 sets an energy variation value (fg_E_var$_{m,l}$) to be "1" indicative of a wide energy variation; and if an energy correlation value is not greater than the energy threshold, step S440 sets the energy variation value to be "0" indicative of a slight energy variation.

Please refer to FIG. 3. The variation information decision circuit 330 is configured to process the X energy variation value(s) to generate L energy variation detection value(s), then compare each of the L energy variation detection value(s) with a variation threshold to generate L comparison result(s), and then generate the environment detection result according to the L comparison result(s). In an exemplary implementation, the variation information decision circuit adds up the M energy variation value(s) of each frame (in connection with a value of the aforementioned frame index) with respect to the X energy variation value(s) as shown in the equation (4) below and thereby generates the L energy variation detection value(s) (S_E_var$_l$); afterwards, the variation information decision circuit 330 compares each of the L energy variation detection value(s) with a variation threshold (thr) and thereby generates L comparison result(s) (fg_S$_l$) as shown in the equation (5) below. If the L comparison result(s) indicate(s) that all/most of multiple energy variation detection values (e.g., the L energy variation detection values while the L is greater than one here) are greater than the variation threshold, the variation information decision circuit 330 determines that the energy variation of the current environment is wide; and if the L comparison result(s) indicate(s) that all/most of the multiple energy variation detection values are not greater than the variation threshold, the variation information decision circuit 330 determines that the energy variation of the current environment is slight.

$$S\_E\_var_l = \sum_{m=1}^{M} fg\_E\_var_{m,l} \qquad \text{eq. (4)}$$

$fg\_S_l$=the comparison result between $S\_E\_var_l$ and thr  eq. (5)

Please refer to FIG. 2 and FIG. 3. The voice activity decision circuit 230 selects one of the multiple VAD results according to a predetermined rule and the variation in the L comparison result(s). The predetermined rule instructs the voice activity decision circuit 230 to select a detection result from the multiple VAD results when the variation in the L comparison result(s) is wider than a predetermined degree of variation, which implies that the energy variation of the current environment is wide; and the predetermined rule instructs the voice activity decision circuit 230 to select another detection result from the multiple VAD results when the variation in the L comparison result(s) is not wider than the predetermined degree of variation, which implies that the energy variation of the current environment is slight. For example, the table 1 below shows the characteristics of a pitch-based VAD and the characteristics of an energy-based VAD; if the voice activity decision circuit 230 prioritizes the miss index and gives lower weight to the false trigger index, the voice activity decision circuit 230 will choose a VAD result generated with an energy-based VAD algorithm when the energy variation of the current environment is wide, and will choose a VAD result generated with a pitch-based VAD algorithm when the energy variation of the current environment is slight.

TABLE 1

|  | miss index (when the energy variation of the current environment is wide) | false trigger index (when the energy variation of the current environment is wide) | miss index (when the energy variation of the current environment is slight) | false trigger index (when the energy variation of the current environment is slight) |
| --- | --- | --- | --- | --- |
| pitch-based VAD | high | low | low | low |
| energy-based VAD | low | high | low | high |

Figure 5:
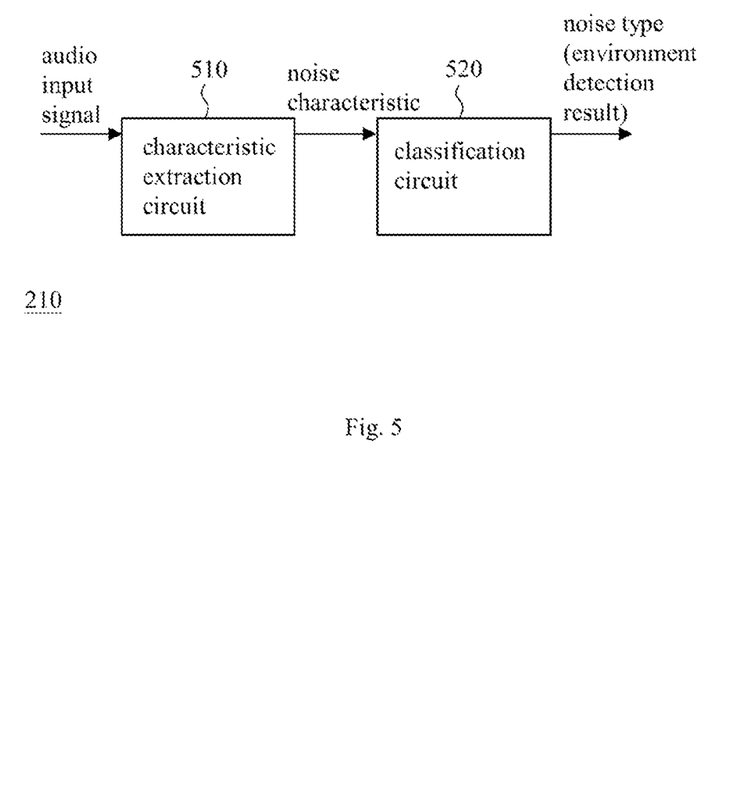
FIG. 5 shows another embodiment of the environment detection circuit of FIG. 2.

FIG. 5 shows another embodiment of the environment detection circuit 210. This embodiment includes a characteristic extraction circuit 510 and a classification circuit 520. The characteristic extraction circuit 510 is configured to process the audio input signal according to at least one characteristic extraction algorithm and thereby generate at least one noise characteristic. The at least one characteristic extraction algorithm is realized with a known/self-developed analysis technology such as Mel-Frequency Cepstral Coefficient (MFCC), Linear Predictive Coding (LPC), or Linear Predictive Cepstral Coefficient (LPCC). The classification circuit 520 is configured to determine at least one noise type as the environment detection result according to the at least one noise characteristic. For example, the classification circuit 520 refers to the noise characteristic generated by the characteristic extraction circuit 510 and obtains a noise type as the environment detection result with a trained statistic mode (e.g., Hidden Markov Model (HMM) or Gaussian Mixture Model (GMM)) or machine learning (e.g., Support Vector Machine (SVM) or Neural Network (NN)).

Please refer to FIG. 2 and FIG. 5. The voice activity decision circuit 230 selects one of the multiple VAD results according to a predetermined rule and the at least one noise type. The predetermined rule instructs the voice activity decision circuit 230 to select a detection result from the multiple VAD results when the at least one noise type relates to a non-stationary noise type, and instructs the voice activity decision circuit 230 to select another detection result from the multiple VAD results when the at least one noise type relates to a stationary noise type. For example, providing the voice activity decision circuit 230 refers to the miss index first and then refers to the false trigger index, the voice activity decision circuit 230 chooses a VAD result generated with an energy-based VAD algorithm when the noise type is indicative of music sounds (i.e., a non-stationary noise type), and chooses a VAD result generated with a pitch-based VAD algorithm when the noise type is indicative of fan sounds (i.e., a stationary noise type).

Figure 6:
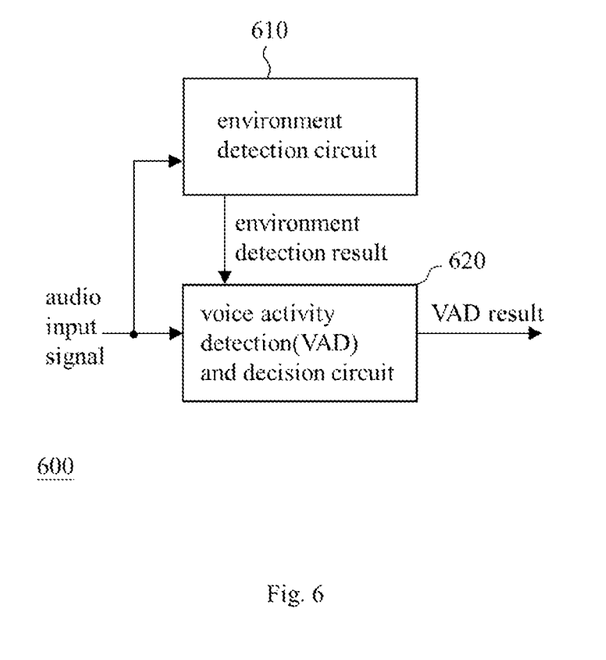
FIG. 6 shows another embodiment of the VAD device of the present disclosure.

FIG. 6 shows another embodiment of the VAD device of the present disclosure. This embodiment is capable of selecting an applicable VAD algorithm from multiple VAD algorithms according to an environment detection result and thereby generating a VAD result with the applicable VAD algorithm, wherein the VAD result is treated as a basis for determining whether a voice activity occurs. The VAD device 600 of FIG. 6 includes an environment detection circuit 610 and a voice activity detection and decision circuit 620. These circuits are described in the following paragraphs.

An embodiment of the environment detection circuit 610 is the environment detection circuit 210 of FIG. 3 or the environment detection circuit 210 of FIG. 5. The voice activity detection and decision circuit 620 is configured to select one of the multiple VAD algorithms as the applicable VAD algorithm according to the environment detection result generated by the environment detection circuit 610, then analyze the audio input signal according to the applicable VAD algorithm, and then generate the VAD result as the basis for determining whether a voice activity occurs. For example, if the environment detection circuit 610 is the environment detection circuit 210 of FIG. 3, the voice activity detection and decision circuit 620 selects one of the multiple VAD algorithms as the applicable VAD algorithm according to a predetermined rule and the variation in the L comparison result(s); the predetermined rule instructs the voice activity detection and decision circuit 620 to select a VAD algorithm (e.g., an energy-based VAD algorithm) from the multiple VAD algorithm when the variation in the L comparison result(s) is wider than a predetermined degree of variation; and the predetermined rule instructs the voice activity detection and decision circuit 620 to select another VAD algorithm (e.g., a pitch-based VAD algorithm) from the multiple VAD algorithms when the variation in the L comparison result(s) is not wider than the predetermined degree of variation. For another example, if the environment detection circuit 610 is the environment detection circuit 210 of FIG. 5, the voice activity detection and decision circuit 620 selects one of the multiple VAD algorithms as the applicable VAD algorithm according to a predetermined rule and at least one noise type; the predetermined rule instructs the voice activity detection and decision circuit 620 to select a VAD algorithm (e.g., an energy-based VAD algorithm) from the multiple VAD algorithm when the noise type is a non-stationary noise type; and the predetermined rule instructs the voice activity detection and decision circuit 620 to select another VAD algorithm (e.g., a pitch-based VAD algorithm) from the multiple VAD algorithms when the noise type is a stationary noise type. It should be noted that analyzing the audio input signal with the applicable VAD algorithm is a known/self-developed technology.

Since those of ordinary skill in the art can appreciate the detail and modification of the embodiment of FIG. 6 by referring to the disclosure of the embodiments of FIGS. 2-5, which implies that some or all of the features of the embodiments of FIGS. 2-5 can be applied to the embodiment of FIG. 6 in a logical way, repeated and redundant description is omitted here.

Figure 7:
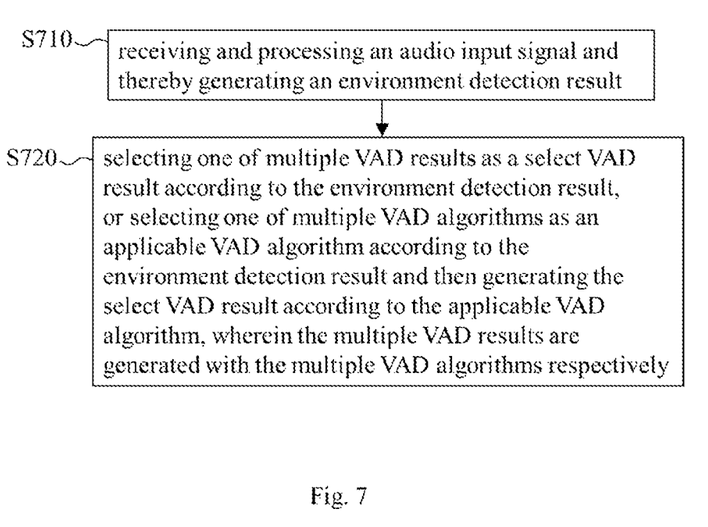
FIG. 7 shows an embodiment of the VAD method of the present disclosure.

FIG. 7 shows an embodiment of the VAD method of the present disclosure. This embodiment can be performed with the VAD device 200 of FIG. 2 or the VAD device 600 of FIG. 6. The VAD method of FIG. 7 includes the following steps:

step S710: receiving and processing an audio input signal and thereby generating an environment detection result; and step S720: selecting one of multiple VAD results as a select VAD result according to the environment detection result, or selecting one of multiple VAD algorithms as an applicable VAD algorithm according to the environment detection result and then generating the select VAD result according to the applicable VAD algorithm, wherein the multiple VAD results are generated with the multiple VAD algorithms respectively.

Since those of ordinary skill in the art can appreciate the detail and modification of the embodiment of FIG. 7 by referring to the disclosure of the embodiments of FIGS. 2-6, which implies that some or all of the features of the embodiments of FIGS. 2-6 can be applied to the embodiment of FIG. 7 in a logical way, repeated and redundant description is omitted here.

It should be noted that people of ordinary skill in the art can selectively use some or all of the features of any embodiment in this specification or selectively use some or all of the features of multiple embodiments in this specification to implement the present invention as long as such implementation is practicable, which implies that the present invention can be carried out flexibly.

To sum up, the VAD device and method of the present disclosure can adopt a suitable VAD result/algorithm according to the ambient noises of a current environment adaptively and thereby achieve a good VAD performance.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A voice activity detection (VAD) device capable of referring to an environment detection result and thereby selecting one of multiple VAD results as a basis for determining whether a voice activity occurs, the VAD device comprising:

an environment detection circuit configured to process an audio input signal and thereby generate the environment detection result, the environment detection circuit including:

a signal analysis circuit configured to generate M processed signal(s) of each of L frame(s) according to the audio input signal, wherein the M processed signal(s) are M frequency band signal(s) or M frequency domain signal(s), the M is a positive integer, and the L is a frame number;

an energy variation detection circuit configured to perform a plurality of steps and thereby generate X energy variation value(s) of the L frame(s), wherein the X is equal to a product of the M and the L and the plurality of steps includes:
- calculating according to the M processed signal(s) of each of the L frame(s) and thereby obtaining X signal energy value(s);
- calculating X short-term energy value(s) according to the X signal energy value(s) and a short-term frame number, and calculating X long-term energy value(s) according to the X signal energy value(s) and a long-term frame number;
- obtaining X energy correlation value(s) according to the X short-term energy value(s) and the X long-term energy value(s), wherein each of the X energy correlation value(s) is a ratio of one of the X short-term energy value(s) to a corresponding one of the X long-term energy value(s); and
- comparing each of the X energy correlation value(s) with an energy threshold and thereby generating the X energy variation value(s); and a variation information decision circuit configured to process the X energy variation value(s) to generate L energy variation detection value(s), then compare each of the L energy variation detection value(s) with a variation threshold to generate L comparison result (s), and then generate the environment detection result according to the L comparison result(s);

a VAD circuit configured to analyze the audio input signal with multiple VAD algorithms and thereby generate the multiple VAD results; and a voice activity decision circuit configured to select one of the multiple VAD results as the basis for determining whether the voice activity occurs according to the environment detection result.

2. The VAD device of claim 1, wherein a first energy variation value of the X energy variation value(s) is generated by comparing a first energy correlation value of the X energy correlation value(s) with the energy threshold; when the first energy correlation value is greater than the energy threshold, the first energy variation value is set to be indicative of a wide energy variation; when the first energy correlation value is not greater than the energy threshold, the first energy variation value is set to be indicative of a slight energy variation; and the wide energy variation is in favor of an energy-based VAD algorithm of the multiple VAD algorithms while the slight energy variation is in favor of a pitch-based VAD algorithm of the multiple VAD algorithms.

3. The VAD device of claim 1, wherein the signal analysis circuit includes at least one filter circuit configured to generate the M frequency band signal(s) of each of the L frame(s) according to the audio input signal, or the signal analysis circuit includes at least one conversion circuit configured to generate M frequency domain signal(s) of each of the L frame(s) according to the audio input signal.

4. The VAD device of claim 1, wherein the variation information decision circuit adds up the M energy variation value(s) of each of the L frame(s) in connection with the X energy variation value(s) and thereby generates the L energy variation detection value(s).

5. The VAD device of claim 1, wherein the voice activity decision circuit selects one of the multiple VAD results according to a predetermined rule and a variation in the L comparison result(s); the predetermined rule instructs the voice activity decision circuit to select a detection result from the multiple VAD results when the variation in the L comparison result(s) exceeds a predetermined variation range; and the predetermined rule instructs the voice activity decision circuit to select another detection result from the multiple VAD results when the variation in the L comparison result(s) does not exceed the predetermined variation range.

6. A voice activity detection (VAD) device capable of referring to an environment detection result and thereby selecting one of multiple VAD algorithms, the VAD device comprising:
- an environment detection circuit configured to process an audio input signal and thereby generate the environment detection result, the environment detection circuit including:
  - a signal analysis circuit configured to generate M processed signal(s) of each of L frame(s) according to the audio input signal, wherein the M processed signal(s) are M frequency band signal(s) or M frequency domain signal(s), the M is a positive integer, and the L is a frame number;
  - an energy variation detection circuit configured to perform a plurality of steps and thereby generate X energy variation value(s) of the L frame(s), wherein the X is equal to a product of the M and the L and the plurality of steps includes:
    - calculating according to the M processed signal(s) of each of the L frame(s) to obtain X signal energy value(s);
    - calculating X short-term energy value(s) according to the X signal energy value(s) and a short-term frame number, and calculating X long-term energy value(s) according to the X signal energy value(s) and a long-term frame number;
    - obtaining X energy correlation value(s) according to the X short-term energy value(s) and the X long-term energy value(s), wherein each of the X energy correlation value(s) is a ratio of one of the X short-term energy value(s) to a corresponding one of the X long-term energy value(s); and
    - comparing each of the X energy correlation value(s) with an energy threshold to generate the X energy variation value(s); and
  - a variation information decision circuit configured to process the X energy variation value(s) to generate L energy variation detection value(s), then compare each of the L energy variation detection value(s) with a variation threshold to generate L comparison result (s), and then generate the environment detection result according to the L comparison result(s); and
- a voice activity detection and decision circuit configured to select one of the multiple VAD algorithms as an applicable VAD algorithm according to the environment detection result, and further configured to analyze the audio input signal with the applicable VAD algorithm and thereby generate a VAD result as a basis for determining whether a voice activity occurs.

7. The VAD device of claim 6, wherein a first energy variation value of the X energy variation value(s) is generated by comparing a first energy correlation value of the X energy correlation value(s) with the energy threshold; when the first energy correlation value is greater than the energy threshold, the first energy variation value is set to be indicative of a wide energy variation; when the first energy correlation value is not greater than the energy threshold, the first energy variation value is set to be indicative of a slight energy variation; and the wide energy variation is in favor of an energy-based VAD algorithm of the multiple VAD algorithms while the slight energy variation is in favor of a pitch-based VAD algorithm of the multiple VAD algorithms.

8. The VAD device of claim 6, wherein the signal analysis circuit includes at least one filter circuit configured to generate the M frequency band signal(s) of each of the L frame(s) according to the audio input signal, or the signal analysis circuit includes at least one conversion circuit configured to generate M frequency domain signal(s) of each of the L frame(s) according to the audio input signal.

9. The VAD device of claim 6, wherein the variation information decision circuit adds up the M energy variation value(s) of each of the L frame(s) in connection with the X energy variation value(s) and thereby generates the L energy variation detection value(s).

10. A voice activity detection (VAD) method, comprising following steps:
   receiving and processing an audio input signal and thereby generating an environment detection result, wherein the step for generating the environment detection result includes:
      generating M processed signal(s) of each of L frame(s) according to the audio input signal, wherein the M processed signal(s) are M frequency band signal(s) or M frequency domain signal(s), the M is a positive integer, and the L is a frame number;
      calculating according to the M processed signal(s) of each of the L frame(s) and thereby generating X energy variation value(s) of the L frame(s), wherein the X is equal to a product of the M and the L, each of the X energy variation value(s) is generated by comparing one of X energy correlation value(s) with an energy threshold, and each of the X energy correlation value(s) is a ratio of one of X short-term energy value(s) to a corresponding one of X long-term energy value(s); and
      processing the X energy variation value(s) to generate L energy variation detection value(s), then comparing each of the L energy variation detection value(s) with a variation threshold to generate L comparison result(s), and then generating the environment detection result according to the L comparison result(s); and
   selecting one of multiple VAD results as a select VAD result according to the environment detection result, or selecting one of multiple VAD algorithms as an applicable VAD algorithm according to the environment detection result and then generating the select VAD result according to the applicable VAD algorithm,
   wherein the multiple VAD results are generated with the multiple VAD algorithms respectively.

11. The VAD method of claim 10, wherein a first energy variation value of the X energy variation value(s) is generated by comparing a first energy correlation value of the X energy correlation value(s) with the energy threshold; when the first energy correlation value is greater than the energy threshold, the first energy variation value is set to be indicative of a wide energy variation; when the first energy correlation value is not greater than the energy threshold, the first energy variation value is set to be indicative of a slight energy variation; and the wide energy variation is in favor of an energy-based VAD algorithm of the multiple VAD algorithms while the slight energy variation is in favor of a pitch-based VAD algorithm of the multiple VAD algorithms.

* * * * *